United States Patent [19]  [11]  4,154,924
Tegge et al.  [45]  May 15, 1979

[54] BUTYL REACTOR OVERFLOW PLUGGING AND POST REACTOR POLYMERIZATION PREVENTION

[75] Inventors: Bruce R. Tegge, Madison; Ralph H. Schatz, Westfield, both of N.J.; Donald M. Beeson, Irvine, Calif.; L. Sherwood Minckler, Jr., Watchung, N.J.

[73] Assignee: Exxon Research & Engineering Co., Florham Park, N.J.

[21] Appl. No.: 892,331

[22] Filed: Mar. 31, 1978

[51] Int. Cl.$^2$ ............................................... C08F 6/02
[52] U.S. Cl. ................................. 528/496; 528/487; 528/492; 528/493; 528/495
[58] Field of Search ............... 528/493, 495, 496, 487, 528/492

[56] References Cited

U.S. PATENT DOCUMENTS

| | | | |
|---|---|---|---|
| 2,356,128 | 8/1944 | Thomas et al. | 526/237 |
| 2,455,665 | 12/1948 | Ford et al. | 526/67 |
| 3,023,191 | 2/1962 | Tegge et al. | 526/41 |
| 3,257,349 | 6/1966 | Johnson et al. | 526/68 |

*Primary Examiner*—Stanford M. Levin
*Attorney, Agent, or Firm*—A. H. Krumholz; H. L. Cohen

[57] ABSTRACT

Methods for producing rubbery polymers are disclosed comprising forming a slurry of such rubbery polymers, preferably butyl rubber prepared from a mixture of a $C_4$ to $C_8$ isoolefin and a $C_4$ to $C_{10}$ conjugated mutiolefin in a low temperature reaction zone in the presence of a Friedel-Crafts catalyst and an organic halide diluent, passing that slurry into an overflow passage for transporting the slurry to a recovery system, and injecting a mixture of a hydrocarbon liquid having a boiling point above the boiling point of the organic halide and a polar organic catalyst quenching agent into said overflow passage at a point adjacent to the outlet from the reaction zone in order to prevent continued production of polymer in the overflow passage and to maintain the overflow passage substantially free of agglomerates.

15 Claims, 1 Drawing Figure

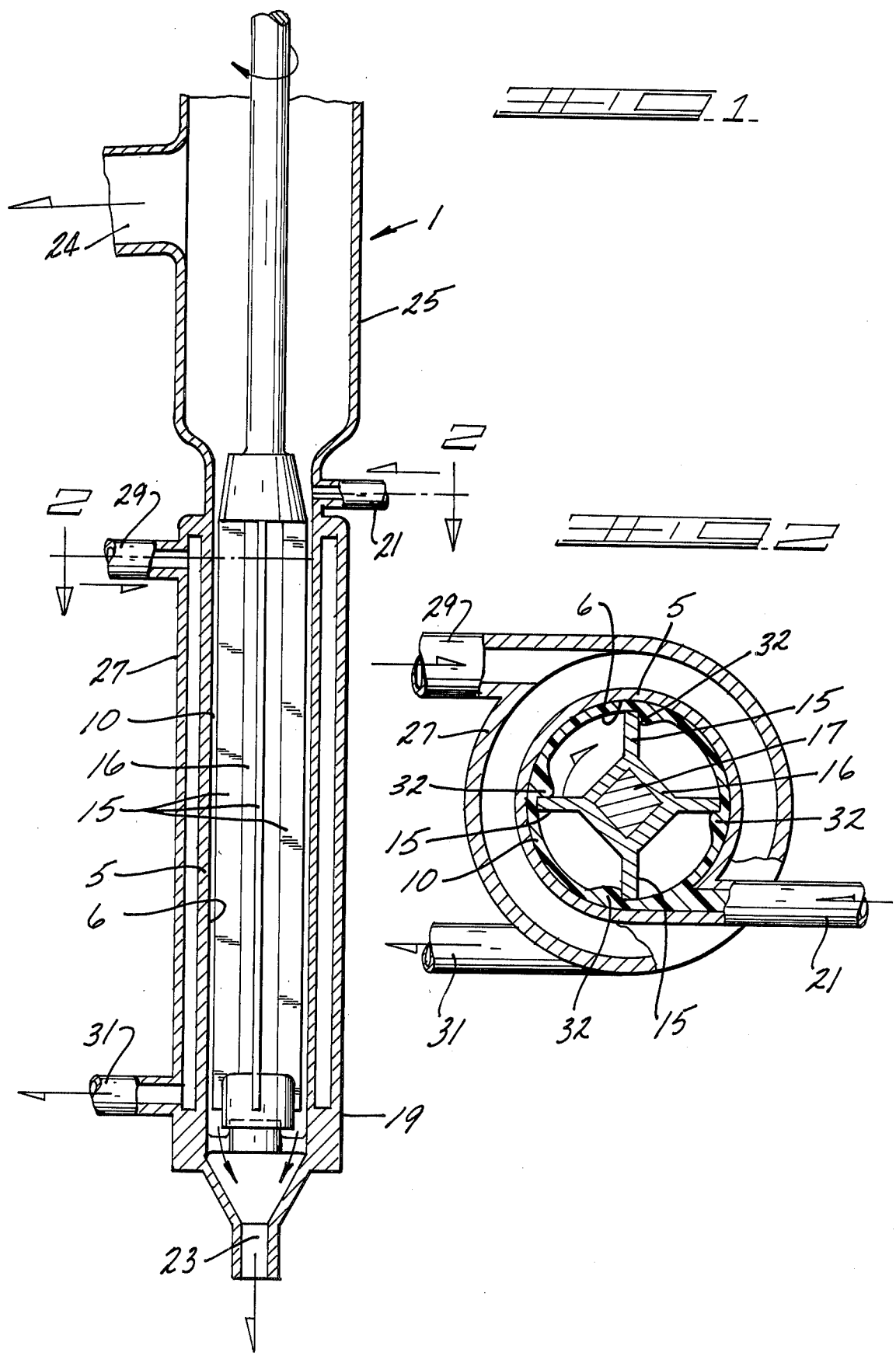

Н,154,924

BUTYL REACTOR OVERFLOW PLUGGING AND POST REACTOR POLYMERIZATION PREVENTION

FIELD OF THE INVENTION

The present invention relates to improved methods for processing rubbery polymers, and in particular rubbery isoolefin-multiolefin-containing copolymers. More particularly, the present invention relates to an improved process for processing such rubbery polymers and in particular for preventing plugging in the overflow line from the reactor to the recovery system. Still more particularly, the present invention relates to an improved process for preventing post-polymerization and consequent deterioration of product molecular weight by dilution with low molecular weight polymeric materials.

BACKGROUND OF THE INVENTION

The preparation of rubbery polymers such as butyl rubber and halogenated butyl rubber is well known and has been commercial for some time. This is generally accomplished in the presence of a Friedel-Crafts catalyst at relatively low temperatures and in the presence of an organic diluent, such as an organic halide. Such processes are generally employed for the preparation of butyl rubbers, generally defined as including a copolymer of about 60 to 99.5% by weight of an isoolefin having from about 4 to 8 carbon atoms, such as isobutylene, and from about 40 to 0.5% by weight of a conjugated multiolefin having from about 4 to 14 carbon atoms, preferably between about 4 and 8 carbon atoms, such as butadiene or preferably isoprene. Halogenated butyl rubbers are also prepared by conventional techniques carried out thereon.

Such polymers are generally prepared in a reactor and then the polymer slurry prepared therein is generally withdrawn from the outlet of the reactor and into a reactor overflow line for transport to the initial phase of the recovery system, generally comprising a flash drum where unreacted monomers and diluent are removed by flash vaporization. It has been found in the past, however, that polymer lumps tend to form on the internal surface of the overflow line and interfere with or plug the flow of this slurry from the reactor to the recovery system. Furthermore, some polymerization continues in the overflow line, producing low molecular weight polymers due to the presence of active catalyst and residual unreacted monomers. This continued polymerization generates heat, which induces agglomeration and thus further aggravates the problem of plugging in the overflow line.

In conventional processes for the production of such rubbery polymers, such as that shown in U.S. Pat. No. 3,023,191 to Tegge et al, and assigned to Esso Research and Engineering Co., the assignee of the present application, it has been known to remove the polymer slurry from the reactor through such an overflow conduit into a flash drum which is maintained at a temperature sufficiently high to vaporize any organic halide present therein. Simultaneously, various hydrocarbon liquids, including hexane, having boiling points above the boiling point of the organic halide diluent are injected into that flash drum so that a substantial portion of the organic halide flashes off overhead and the polymer may then be drawn off in the hydrocarbon solvent from the flash drum in the form of a polymer cement, for further processing. These patents have also taught that a small amount of water, for example up to about 500 wppm (parts per million by weight), can be included in the hydrocarbon solvent in order to assist in deactivating the Friedel-Crafts catalyst present therein, or that a small amount of an oxygenated hydrocarbon such as an alcohol (e.g. isopropanol) can be blended with the solvent or injected separately into the flash drum in order to prevent "after" polymerization therein. Water, for example, could not be employed in the proximity of the reactor outlet because it will immediately freeze in view of the temperatures encountered at that point.

It is also known to feed steam and water into the flash drum itself in order to similarly remove volatile materials and to reslurry the polymer in an aqueous suspension, which can then be removed therefrom. This is shown for example in U.S. Pat. No. 3,257,349 to Johnson, Jr. et al, also assigned to Esso Research and Engineering Co.

In view of the continued problems of plugging and after polymerization which have persisted in such commercial polymerization facilities, there have been considerable efforts to overcome the problems associated with plugging of the slurry flow in the overflow line or passageway from the reactor to the flash drum. These have included an attempt to coat the inside of the overflow line with a polyhaloethylene coating, but such attempts have not been entirely successful. Furthermore, in a commercial butyl plant operated by the assignee of the present invention in Fawley, England, an attempt to flush out the overflow line has been made by injecting the hydrocarbon solvent, such as hexane, into the overflow line at a point in proximity to the outlet of the reactor itself. Some of the products produced by this process, which was not carried out publicly in England, may have been sold in the United States more than one year prior to the filing date of this application. This process, however, was counter-productive in that it tended to induce even greater post-polymerization by the heating created by the warm hexane into the overflow line. These attempts have therefore not been entirely successful and have not been capable of maintaining a free flowing overflow line, of preventing further polymerization therein, or of preventing the concomitant reduction in the quality of the polymer obtained as a result thereof.

SUMMARY OF THE INVENTION

In accordance with the present invention these and other problems have been overcome by forming a slurry of rubbery polymer, preferably butyl rubber prepared from a mixture of a $C_4$ to $C_8$ isoolefin and a $C_4$ to a $C_{10}$ conjugated multiolefin, in a low temperature reaction zone in the presence of a Friedel-Crafts catalyst and an organic halide diluent, passing the slurry from the reaction zone into an overflow passage for transporting the slurry to a recovery system, and injecting a mixture of a hydrocarbon liquid having a boiling point above the boiling point of the organic halide and a polar organic catalyst quenching agent into the overflow passage at a point adjacent to the outlet from the reaction zone. Thus, the use of this process entails a variety of significant advantages. Firstly, continued production of polymer in the overflow passage is prevented, i.e., polymerization is confined almost entirely to the reaction zone itself. Secondly, the overflow passage may now be maintained substantially free of agglomerates. Thirdly, as a result of termination of post-polymerization, there is a significant reduction in product polymer deterioration by polymer molecular weight reduction previously caused by product dilution with low molecular weight materials. Fourth, there is a significant decrease in the need to employ water in these processes as a means to assist in deactivation of the polymerization catalyst as well as to assist in the removal of volatile materials and for reslurrying the polymer in the flash drum. This in turn results in increased safety factors in connection with reduced corrosion problems in the fractionating towers and other such equipment generally used in the processing of these polymers.

In a preferred embodiment of the present invention, the combination of from about 15 to 100% by weight of the hydrocarbon liquid based on the reactor effluent entering the overflow line, and preferably from about 25 to 50% by weight and from about 0.5 to 10 moles of catalyst quenching agent per mole of catalyst contained in the reactor effluent, and preferably from about 1 to 3 moles/mole, is injected into the overflow passage at a point substantially at the outlet of the reactor itself.

Further in accordance with the present invention it has been found that the combination of liquid hydrocarbon and polar organic catalyst quenching agent serves to uniformly distribute the catalyst quenching agent throughout the reactor polymer slurry so as to obtain significantly improved contact between quenching agent and catalyst in the slurry, and it is also possible to operate the reactor at higher slurry concentrations so that increased polymer production capacity is obtained.

In one embodiment of the present invention the total amount of liquid hydrocarbon and catalyst quenching agent injected into the overflow passage will comprise from between about 10 to 100 weight percent of the total amount of polymer slurry added thereto, or on another basis the amount of catalyst quenching agent will be such that the mole ratio of catalyst quenching agent to the amount of catalyst contained in the slurry will range from about 0.5 to about 10.

In another embodiment of the present invention the organic halide diluent employed in the reaction zone will comprise an alkyl halide, preferably methyl chloride. In yet another embodiment thereof the Friedel-Crafts catalyst employed will comprise an aluminum halide, such as aluminum chloride.

In a preferred embodiment of the present invention the organic catalyst quenching agent will comprise a polar oxygenated compound having a boiling point above about 150° C., and most preferably such compounds as aldehydes, alcohols, glycols, ketones, and the like. Most preferably a glycol, such as triethylene glycol, will be employed.

BRIEF DESCRIPTION OF THE FIGURE

In order to more fully appreciate the present invention reference is made to the FIGURE, which is a schematic representation of a portion of a butyl facility incorporating the method of the present invention therein.

DETAILED DESCRIPTION

Most preferred among the rubbery polymers in accordance with the present invention are isoolefin-multiolefin copolymers prepared by reacting from 60 to 99.5 weight percent, preferably from 85 to 99.5 weight percent, of an isoolefin with from about 40 to 0.5 weight percent, preferably 15 to 0.5 weight percent of a multiolefin. The isoolefin in general will contain from about 4 to 8 carbon atoms, and will include compounds such as isobutylene, 2-methyl butene-1, 3-methyl butene-1, 4-methyl pentene-1, 2-ethyl butene-1, 4-ethyl pentene-1, or the like, or a mixture of such isoolefins, and the multiolefin will generally contain from about 4 to 10 carbon atoms, and can include one or more of the following compounds:

(a) Acyclic or open-chain conjugated diolefins such as butadiene-1,3; isoprene; 2,4-dimethyl butadiene-1,3; piperylene; 3-methyl pentadiene-1,3; hexadiene; 2-neopentylbutadiene-1,3; and the like;

(b) Alicyclic diolefins, both conjugated and nonconjugated, such as cyclopentadiene, methyl cyclopentadiene; dicyclopentadiene, cyclohexadiene, 1-vinyl cyclohexene-3; 1-vinyl cyclohexene-1; 1-vinyl cyclopentene-1; 1-vinyl cyclobutene-2; dimethyl dicylopentadiene; and the like, as well as monocyclic diolefinic terpenes such as dipentene, terpinenes, terpinolene, phellandrenes, sylvestrene, etc.;

(c) Acyclic triolefins such as 2,6-dimethyl-4-methylene heptadiene-2,5; 2-methyl hexatriene-1,3,5 and other conjugated triolefins, as well as myrcene, ocimene, allo-ocimene and the like;

(d) Alicyclic triolefins such as fulvene, 6,6-dimethyl fulvene; 6,6-methyl ethyl fulvene; 6-ethyl fulvene; 6-6-diphenyl fulvene; 6-phenyl fulvene and other such fulvenes, as well as other alicyclic triolefins such as 1,3,3-trimethyl-6-vinyl-cyclohexadiene-2,4; cycloheptatriene, etc.; and (e) Higher multiolefins such as 6,6-vinyl methyl fulvene (a tetraolefin) and 6,6-diisopropenyl fulvene (a pentaolefin) or the like.

Of course within this class of compounds the particularly preferred rubbery isoolefin-multiolefin will be butyl rubber, which has been prepared by the copolymerization of the above-noted monomers in the presence of a Friedel-Crafts catalyst, preferably dissolved in an inert diluent at temperatures between 0° C. to about −200° C., and preferably between about −30° C. and −100° C.

The Friedel-Crafts catalyst employed will preferably comprise an aluminum halide catalyst, such as aluminum chloride, or other such catalysts including titanium tetrachloride, boron trifluoride, aluminum ethyl dichloride, aluminum ethoxy-chloride, etc. The amount of catalyst employed generally ranges from about 0.01 to about 0.2 weight percent of the mixed olefins or monomers discussed above.

The polymerization which occurs in the reactor under the above conditions is extremely rapid, and the polymer precipitates out of solution in the form of a slurry or flocculent white solid. The polymer, which is then recovered and dried, has a Staudinger molecular weight between about 20,000 and 150,000, i.e. viscosity average molecular weights between about 200,000 up to about 2,000,000 preferably between about 300,000 and 550,000, and an iodine number between about 0.5 and 50, preferably between about 1 and 15. The preparation of this copolymer is described in U.S. Pat. Nos. 2,356,128 and 2,455,655, which are incorporated herein by reference thereto.

It is also important to select a polymerization diluent which is inert for the system under consideration. Preferably such an inert diluent as a $C_1$ to $C_3$, or preferably a $C_1$ or $C_2$ alkyl halide, such as methyl chloride, which is a solvent for the monomer and catalyst but not for the rubbery polymer, is employed in the preparation of butyl rubber.

The liquid hydrocarbon injected into the overflow line has several significant functions. It serves to flush the overflow line itself of any agglomerates which may be present therein. Furthermore, it serves as a media in which the catalyst quenching agent is dispersed so that optimum rapid contact between catalyst quenching agent and the catalyst itself can be obtained in the overflow line. Finally, it also serves the above described function of acting as the solvent for the polymer and assisting in the flashing of the organic halide diluent from the flash drum. It is primarily for the latter reason that this liquid hydrocarbon must have a boiling point higher than that of the organic halide diluent. As discussed above, by serving these functions the liquid hydrocarbon also results in the added advantage of reducing the amount of water presently being used in such systems.

These liquid hydrocarbons will thus preferably comprise $C_5$ to $C_{10}$, and preferably $C_5$ to $C_7$ hydrocarbons such as normal or iso-paraffins, including hexane, isohexane, heptane, octane, and isooctane; naphthenes such as cyclohexane and methyl cyclohexane; aromatic hydrocarbons such as benzene, toluene and xylenes; monolefins such as hexenes, heptenes, and octenes; hydrocarbon fractions such as naphtha, gasolines, straight run mineral spirits, very light fractions of cracked gas oils and kerosenes; and mixtures thereof. Preferred solvents include benzene and substantially saturated hydrocarbons such as heptane, hexane, iso-octane, cyclohexane, hydrogenated naphtha and hydrogenated gasolines.

The polar organic catalyst quenching agents employed in the process of this invention will, as discussed above, serve to terminate polymerization outside of the reactor itself, as well as aiding in eliminating agglomeration in the overflow line. Again, however, one must consider the present process on an overall basis, and the above-described advantages of using these agents in combination with the present liquid hydrocarbons, the required location, including the overall reduced need for water, improved product quality, etc. These agents must have sufficiently high boiling points so that they remain almost entirely in the polymer solvent (i.e., the hydrocarbons discussed above) and do not flash overhead from the flash drum along with the organic halide, unreacted monomers, and hydrocarbon solvents added to the reactor overflow line. This requires a boiling point which is significantly higher than the boiling point of these materials that is preferably at least 100° C., and most preferably at least 150° C. higher than the boiling point of the hydrocarbon solvent. If not, the much higher vapor pressures of these agents realized in the hydrocarbon system present in the flash drum will result in the vaporization and loss of a significant amount of the organic quenching agent, and in subsequent problems of its removal from the recovered organic halide and unreacted monomers which are recycled to the reactor. These atmospheric boiling points for the quenching agents will thus generally be greater than about 135° C., preferably greater than about 200° C.

As for these agents themselves, they may comprise a variety of polar organic catalyst quenching agents which include polar groups which will combine with the halogen component of the Friedel-Crafts catalyst to deactivate same. These can include polar oxygenated compounds, as well as various amines, sulfur compounds, etc. The oxygenated compounds are highly preferred, however, for a variety of reasons including ease of utilization, economics and potential pollution problems, and they can include aldehydes, alcohols, glycols, ketones, etc. However, the glycols are particularly preferred, such as ethylene glycol, diethylene glycol, triethylene glycol, tetraethylene glycol, etc., because of their higher boiling points and their reactivity in quenching the polymerization catalyst, again providing that the compounds employed meet the parameters discussed above. Most preferably triethylene glycol will be the quenching agent so utilized.

Referring specifically to the FIGURE, the method of the present invention may be more fully understood. Polymerization in accordance with the above description is carried out in reactor 1, which includes stirring means 3 therein. The ingredients discussed above are maintained in the reactor at the above temperatures and at pressures between about 10 and 250 psia. The polymer slurry produced in reactor 1 is then withdrawn therefrom through the reactor outlet 5, and into overflow line or passage 9 and the slurry generally includes a mixture of between about 0.15 and 0.3 weight fraction (i.e., 15 to 30 weight percent) of polymer, from about 0.62 to 0.82 weight fraction of inert diluent, and includes from about 0.03 to 0.08 weight fraction unreacted monomer, and from 30 to 300 parts per million (on a weight basis) of active Friedel-Crafts catalyst. This slurry is then fed into flash drum 11 through the flash drum inlet 15. The flash drum itself is desirably operated under pressures of between about 5 and 50 psig or higher, but preferably between about 2 to about 25 psi below the pressure maintained in the polymerization zone, so as to provide a driving force for flow of the reactor slurry from the reactor to the flash zone.

In accordance with the present invention a combination of a hydrocarbon solvent boiling above the boiling point of the inert polymerization diluent and an organic catalyst quenching agent is injected into the overflow passage 9 through line 7 at a point adjacent or in proximity to the reactor outlet 5. Preferably, the point of entry of this mixture will be located almost exactly at the reactor outlet 5, but generally between about 0.5 and 6 feet, and preferably from about 0.5 to 2 feet therefrom, so as to prevent any return flow of the mixture into the reactor 1 itself. The materials in line 7 are provided in the following manner. The organic catalyst quenching agent is maintained in supply drum 33, and fed through lines 35 and 39 into static mixer 31, while the liquid hydrocarbon, such as hexane, is fed through lines 37 and 39 into a mixer 31, so that a uniform mixture of the two components, with the organic catalyst quenching agent, such as triethylene glycol, dispersed uniformly throughout the organic hydrocarbon, is obtained in line 7 for injection into overflow line 9. In this manner the slurry with the added components enters the flash drum 11 as shown in the FIGURE. Furthermore, additional hydrocarbon, such as hexane, can be added to the flash drum 11 through spray heads 27 in the form of a vapor below the liquid surface therein. Additional liquid hydrocarbon can be added to the flash drum to control the concentration of the resulting polymer solution, but it is also possible to add the total amount of such liquid hydrocarbon in this system through line 7 as discussed above. If, however, additional liquid hydrocarbon is to be added, it can be added into the flash drum 11 through line 29. Furthermore, steam can be added along with the hydrocarbon vapors by injection into lines 23 and 25, and finally through line 21 and spray heads 27. A mixer 13 is also included in the flash drum in order to maintain uniform contact therein.

Within the flash drum 11 the major amount of the inert organic halide diluent, along with any unreacted monomers contained in the polymer slurry, is flashed overhead through line 17 for subsequent drying (generally in alumina dryers) and recovery. Furthermore, the polymer cement composition now dissolved in liquid hydrocarbon solvent is withdrawn from the flash drum 11 through line 19 for further processing, such as for the production of halogenated butyl rubber and the like.

DESCRIPTION OF THE PREFERRED EMBODIMENT

Referring to the FIGURE, in a preferred embodiment of the present invention, a polymerization reactor 1 is provided, including a stirrer 3 therein. The reactor itself is preferably surrounded by a heat insulating jacket which is also a refrigerated jacket, and the reactor 1 also includes a feed inlet 2, a catalyst inlet 4 and a product outlet 5. A preferred feed is fed through feed inlet 2 and includes 315 pounds/hour of isoprene, 9,000 pounds/hour of isobutylene, and 20,685 pounds/hour of methyl chloride, for a total feed through inlet 2 of 30,000 pounds/hour. The catalyst fed into the reactor 1 through line 4 comprises 3.0 pounds/hour of aluminum chloride catalyst and 1,997 pounds/hour of methyl chloride in which the catalyst is dissolved. Polymerization is thus carried out in reactor 1 at a temperature of between about $-98°$ and $-90°$ C. and at a pressure of 50 psig for a nominal reactor residence time of about 30 minutes. The reaction is carried out until a slurry withdrawn from reactor 1 reactor outlet 5 into overflow line 9 comprises from between 22 to 25 weight percent of polymer in the overall reactor effluent. In order to preferably accommodate this equipment, the overflow line 9 will generally be from about 15 to 250 feet long, or more, generally between about 15 and 150 feet long. The method of the present invention has added significance in that it permits the flexability inherent in being able to employ overflow lines 9 of greater length, i.e., such as greater than about 50 feet. Into the 32,000 pounds/hour of slurry removed through reactor outlet 5 is injected a stream of hexane and triethylene glcyol through line 7. Thus, in preparation of this material triethylene glycol retained in tank 33 is pumped through lines 35 and 39 static into mixer 31 while hexane is pumped through lines 37 and 39 into the static mixer 31, so that the amount of their combination injected into the overflow line 9 through line 7 includes 5.8 pounds/hour of triethylene glycol and 10,000 pounds/hour of hexane.

In this manner polymerization is substantially terminated upon entry of the slurry into overflow line 9, agglomeration is prevented therein, and the slurry including hexane and triethylene glycol easily passes through line 9, and into flash drum 11 through flash drum inlet 15. The flash drum itself is maintained at a temperature of 38° C. and a pressure of 20 psig. In addition, hexane vapor is injected into the flash drum 11 through lines 21 and 25 as well as through spray heads 27, and hexane liquid is introduced through line 29 in an amount such that an additional 50,500 pounds/hour of hexane is added thereto. In this manner the overhead stream 17 recovered from flash drum 11 includes the major portion of the methyl chloride and unreacted monomers and some hexane, i.e. about 36,200 pounds/hour total, and approximately 1.2 pounds/hour of HCl. It should be noted at this point that the HCl is principally produced in overflow line 9 when the catalyst quenching agent, namely the triethylene glycol, reacts with the aluminum chloride catalyst, thus deactivating the catalyst and producing HCl in the process. As stated above, additional hexane liquid is added to the flash drum 11 through line 29, but whether added at that point or not, the total amount of hexane added in the liquid form as between lines 7 and 29 should remain relatively constant to maintain a constant polymer concentration in the liquid phase leaving the flash drum.

The butyl cement removed from flash drum 11 through line 19 will thus include approximately 42,400 pounds/hour of hexane, about 7,900 pounds/hour of butyl rubber, and the remainder comprising unreacted monomer, diluent, and catalyst.

The remaining portion of the overall butyl or chlorobutyl facilities used in conjunction with this apparatus and method are not shown in the FIGURE since they are conventional units, and do not constitute part of the present invention.

It is therefore not only possible when operated in accordance with the present invention to efficiently produce butyl rubber as shown in the FIGURE, without the prior problems of plugging and agglomeration in overflow line 9, but it is now also possible to operate the polymerization reactor so as to produce a slurry having increased polymer content of between 22 and 30 weight percent as compared to prior maximums of between 18 and up to about 20 weight percent. This is of course true because of the ability to prevent continued polymerization and the production of low molecular weight products in overflow line 9 and flash drum 11 in accordance with the present invention.

Having described the general nature and specific embodiments of this invention, it is understood that the invention is not to be limited thereby but is to be interpreted in accordance with the appended claims hereto.

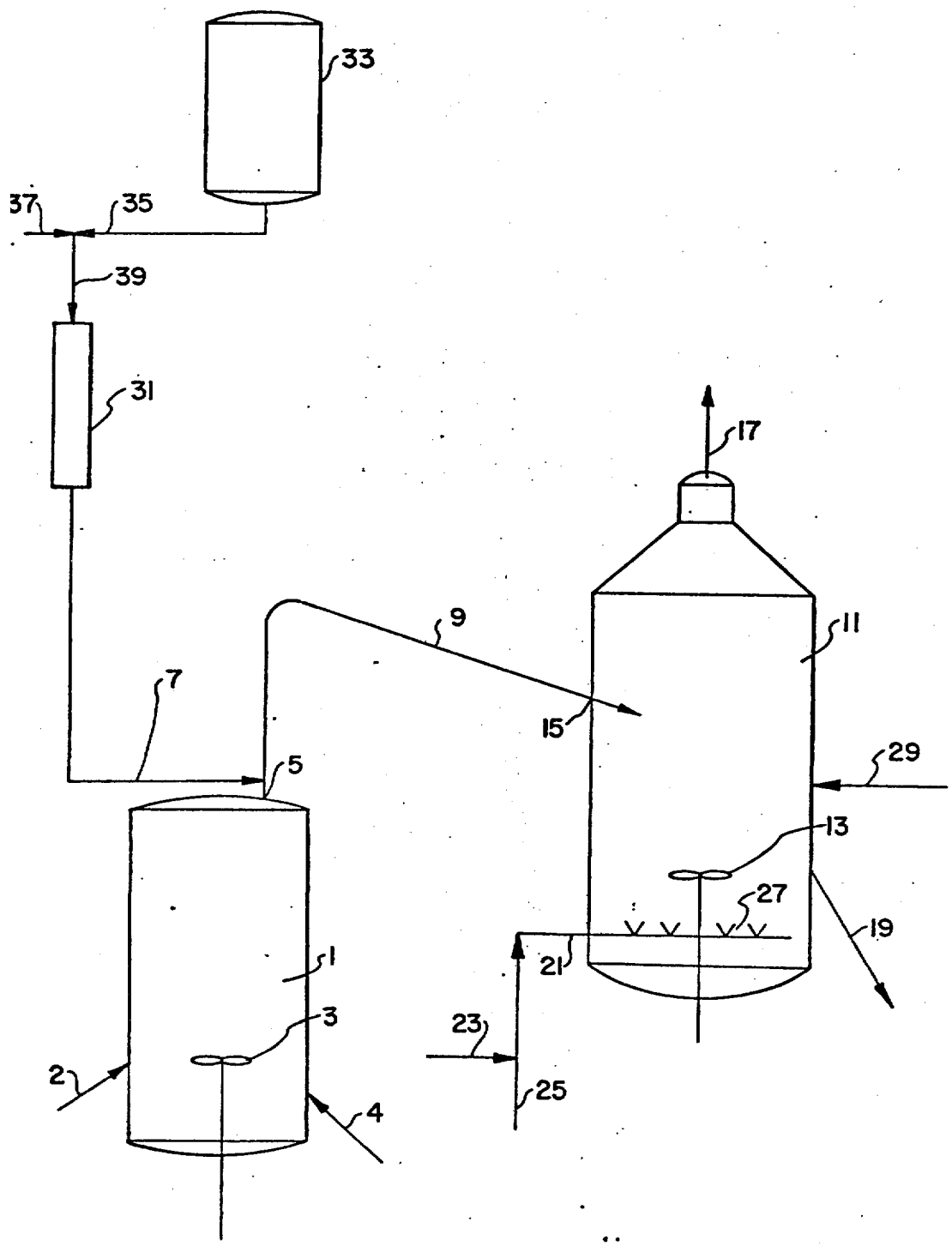

We claim:

1. A method for producing a rubbery polymer which comprises forming a slurry of said rubbery polymer from its monomeric components in a low temperature reaction zone in the presence of a Friedel-Crafts catalyst and an organic halide diluent, passing said slurry from said reaction zone into an overflow passage for transporting said slurry to a recovery system, and injecting a mixture of a hydrocarbon liquid having a boiling point above the boiling point of said organic halide and a polar organic catalyst quenching agent having a boiling point greater than about 135° C. into said overflow passage at a point adjacent to the outlet from said reaction zone so as to prevent continued production of said polymer in said overflow passage and to maintain said overflow passage substantially free of agglomerates.

2. The method of claim 1 wherein said rubbery polymer comprises butyl rubber, and is produced in said reaction zone by the reaction of from about 90 to 99.5 weight percent of a $C_4$ to $C_8$ isoolefin and from about 0.5 to 10 weight percent of a $C_4$ to $C_{10}$ conjugated multiolefin.

3. The method of claim 2 wherein said isoolefin comprises isobutylene and wherein said conjugated multiolefin comprises isoprene.

4. The method of claim 1 wherein said Friedel-Crafts catalyst comprises an aluminum halide.

5. The method of claim 1 wherein said organic halide comprises an alkyl halide.

6. The method of claim 5 wherein said alkyl halide comprises methyl chloride.

7. The method of claim 1 wherein said mixture of said hydrocarbon liquid and said polar organic catalyst quenching agent includes from about 15 to 100 weight percent of said hydrocarbon liquid based on the amount of said slurry passed from said reaction zone and from about 0.5 to 10 moles of said catalyst quenching agent per mole of catalyst contained in said slurry.

8. The method of claim 7 wherein said catalyst quenching agent comprises a polar oxygenated compound having a boiling point greater than about 150° C.

9. The method of claim 8 wherein said polar oxygenated compound is selected from the group consisting of aldehydes, alcohols, glycols, ketones and mixtures thereof.

10. The method of claim 9 wherein said oxygenated compound comprises triethylene glycol.

11. The method of claim 1 wherein said hydrocarbon liquid comprises a $C_5$ to $C_7$ hydrocarbon.

12. The method of claim 11 wherein said hydrocarbon liquid comprises hexane.

13. The method of claim 1 wherein said overflow passage is from between 15 to 250 feet long.

14. The method of claim 1 wherein said slurry comprises from about 15 to 30 weight percent of said rubbery polymer.

15. The method of claim 1 wherein said catalyst quenching agent has a boiling point at least 100° C. higher than the boiling point of said hydrocarbon solvent.

* * * * *

UNITED STATES PATENT OFFICE
CERTIFICATE OF CORRECTION

Patent No. 4,154,924          Dated May 15, 1979

Inventor(s) Bruce R. Tegge, Ralph H. Schatz, Donald M. Beeson and Sherwood Minckler, Jr.

It is certified that error appears in the above-identified patent and that said Letters Patent are hereby corrected as shown below:

Substitute attached Figure for Figures 1 and 2 appearing in the patent.

Signed and Sealed this

Eighteenth Day of September 1979

[SEAL]

Attest:

Attesting Officer

LUTRELLE F. PARKER
Acting Commissioner of Patents and Trademarks